(12) United States Patent
Lalancette et al.

(10) Patent No.: US 9,981,295 B2
(45) Date of Patent: May 29, 2018

(54) METHOD FOR VITRIFICATION OF ARSENIC AND ANTIMONY

(71) Applicant: DUNDEE SUSTAINABLE TECHNOLOGIES INC., Montreal (CA)

(72) Inventors: Jean-Marc Lalancette, Sherbrooke (CA); David Lemieux, Thetford Mines (CA); Khalil Nasrallah, Thetford Mines (CA); Gabriel Garcia Curiel, Hamstead (CA); Romain Barbaroux, St-Joseph-de-Coleraine (CA)

(73) Assignee: DUNDEE SUSTAINABLE TECHNOLOGIES INC., Montreal, Quebec (CA)

( * ) Notice: Subject to any disclaimer, the term of this patent is extended or adjusted under 35 U.S.C. 154(b) by 112 days.

(21) Appl. No.: 15/216,048

(22) Filed: Jul. 21, 2016

(65) Prior Publication Data

US 2018/0023165 A1  Jan. 25, 2018

(51) Int. Cl.
*B09B 3/00* (2006.01)
*C22B 1/11* (2006.01)
*C03C 3/087* (2006.01)

(52) U.S. Cl.
CPC ............ *B09B 3/005* (2013.01); *B09B 3/0025* (2013.01); *B09B 3/0041* (2013.01); *C03C 3/087* (2013.01); *C22B 1/11* (2013.01)

(58) Field of Classification Search
CPC ...... B09B 3/0025; B09B 3/0041; B09B 3/005
See application file for complete search history.

(56) References Cited

U.S. PATENT DOCUMENTS

| | | |
|---|---|---|
| 3,709,680 A | 1/1973 | Holmes et al. |
| 3,883,345 A | 5/1975 | Caldon et al. |
| 3,911,078 A | 10/1975 | Nadkarni et al. |
| 3,933,475 A | 1/1976 | Swanson |
| 3,969,202 A | 7/1976 | Albrethsen et al. |
| 4,051,220 A | 9/1977 | Coltrinari |
| 4,078,917 A | 3/1978 | Swanson |
| 4,096,232 A | 6/1978 | Vogt |
| 4,244,927 A | 1/1981 | Reynolds et al. |
| 4,441,993 A | 4/1984 | Howald |
| 4,452,706 A | 6/1984 | Shaw et al. |

(Continued)

FOREIGN PATENT DOCUMENTS

| | | |
|---|---|---|
| CA | 2926123 | 12/2016 |
| WO | 2015058257 A1 | 4/2015 |
| WO | 2015149111 A1 | 10/2015 |

OTHER PUBLICATIONS

Nakazawa, et al. Simulation of the Removal of Arsenic during the Roasting of Copper Concentrate Metallurgical and Materials Transactions B vol. 30B, Jun. 1999—393 (Year: 1999).*

(Continued)

*Primary Examiner* — John J Kreck
(74) *Attorney, Agent, or Firm* — Nicholas A. Kees; Godfrey & Kahn, S.C.

(57) ABSTRACT

A method for vitrification of arsenic and antimony, comprising substituting oxygen to sulfur on thiosalts, incorporating resulting sodium arsenate and sodium antimonate into a sodium silicate glass-forming mixture and vitrifying the sodium silicate glass-forming mixture into a resulting glass sequestering the arsenic and antimony.

14 Claims, 1 Drawing Sheet

(56) References Cited

U.S. PATENT DOCUMENTS

| | | | |
|---|---|---|---|
| 5,316,751 A * | 5/1994 | Kingsley | B09C 1/02 423/106 |
| 5,649,894 A * | 7/1997 | White | A62D 3/33 106/697 |
| 5,750,019 A | 5/1998 | Olper | |
| 8,998,790 B2 | 4/2015 | Lalancette et al. | |
| 2006/0144192 A1 | 7/2006 | Shapovalov et al. | |
| 2011/0144408 A1 | 6/2011 | Gruber et al. | |
| 2014/0017152 A1 | 1/2014 | Nako et al. | |
| 2014/0107389 A1 * | 4/2014 | Lalancette | C03C 3/087 588/256 |

OTHER PUBLICATIONS

Anderson, C.G. et al., Arsenic Hydrometallurgy; Fundamentals, Technology and Applications, Conference of Metallurgists Proceedings, 2014, pp. 1-16, Ed. Canadian Institute of Mining, Metallurgy and Petroleum, U.S.A.

Harris, Bryn, The removal of arsenic from process solutions: Theory and Industrial Practice, Hydrometallurgy 2003, 5th International Symposium Honoring Professor Ian Ritchie and 33th Annual CIM Hydrometallurgy Meeting and 2003 Fall Extraction and Processing Metallurgy Meeting of TMS, 2003, pp. 1889-1902, Ed. Courtney Young et al., Canada.

EHSO Environmental Health & Safety Online, TCLP Toxicity Characteristic Leaching Procedure, 1992, pp. 1-38, EPA Test Method 1311, U.S.A.—http://www.ehso.com/cssepa/TCLP.htm.

International Search Report for PCT/CA2016/050854; dated Apr. 6, 2017.

* cited by examiner

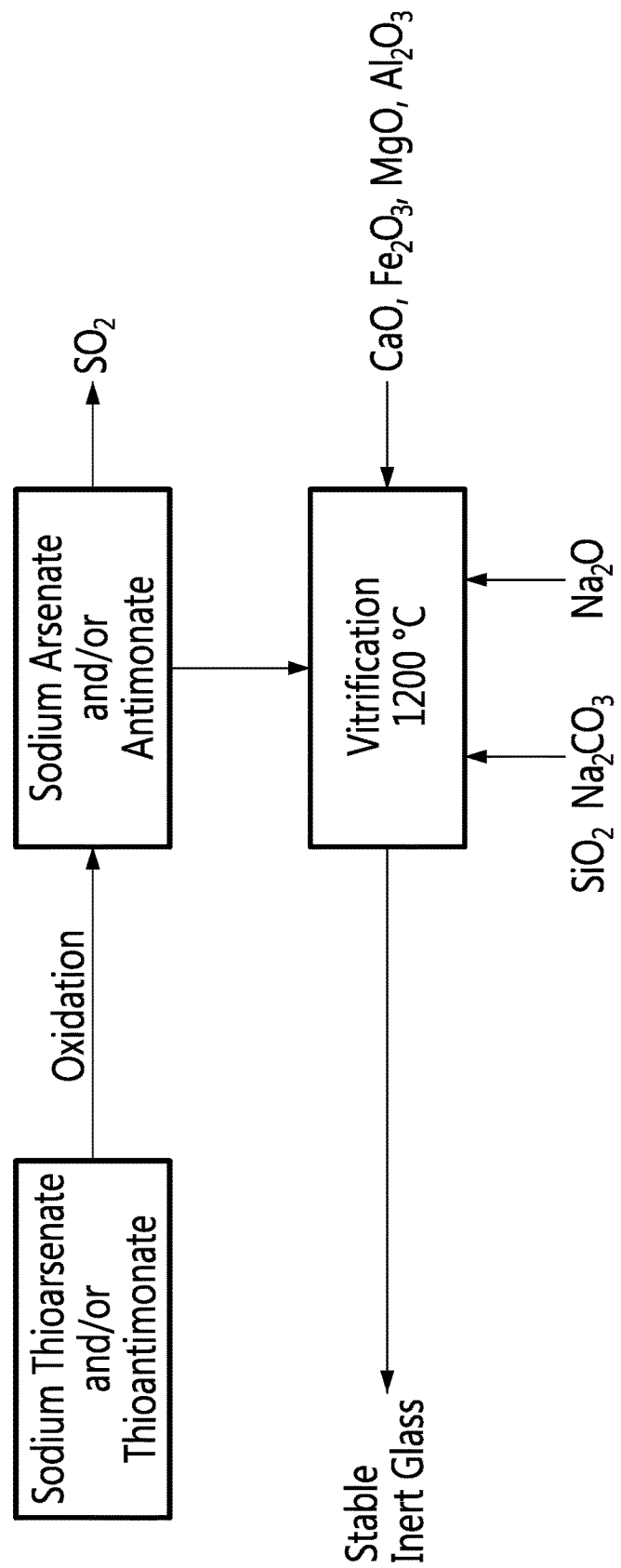

METHOD FOR VITRIFICATION OF ARSENIC AND ANTIMONY

FIELD OF THE INVENTION

The present invention relates to sequestration of arsenic and antimony extracted from sulfo-ore. More specifically, the present invention is concerned with a method for vitrification of arsenic and antimony.

BACKGROUND OF THE INVENTION

Quite frequently, mineral concentrates or ores are tainted with significant amounts of arsenic and antimony. At the time of the smelting of such substrates, the presence of these contaminants can generate substantial penalties or even preclude their treatment.

In order to circumvent such difficulties, several hydrometallurgical processes have been developed to extract the arsenic and the antimony contaminants from the raw ore or concentrate prior to the collection of metallic values therefrom.

In U.S. Pat. No. 3,911,078, Nadkarni et al. report the dissolution of arsenic from a copper ore of the enargite type ($Cu_3AsS_4$) using a basic solution of $Na_2S$ as extractive medium. The arsenic is recovered as sodium thioarsenate and if antimony is present, it is transformed into sodium thioantimonate. These thioarsenate and thioantimonate can be crystallized out from the mother liquor for safe disposal of As and Sb. Nadkarni et al. teach the use of pressure oxidation of the thiosalts of arsenic and antimony in order to substitute oxygen to sulfur on As and Sb, this oxidation being followed by precipitation of As and Sb as hydrated ferric arsenate (scorodite) or as hydrated ferric antimonate.

Several other patents are related to As and Sb extraction, such as U.S. Pat. No. 3,709,680, U.S. Pat. No. 3,911,078 and US Patent Application US2014/0017152A1 for example. These methods use basic sodium sulfide $Na_2S$, sodium hydrosulfide hydrate NaSH or sodium hydroxide NaOH as the extractive reagents. The disposal of the extracted arsenic varies from merely discarding sulfides in tailings to the forming calcium arsenate or a hydrated ferric arsenate such as scorodite. However, disposal of the sulfide as such is to be avoided, environmentally and economically, particularly if the upkeeping of the landfill in the long term is taken into account. As far as calcium arsenate is concerned, this inorganic compound is vulnerable to potential leaching, particularly in sulfur-containing media, under a bacterial action (thiobacillum ferrooxidan). Finally, scorodite is reported to be unstable in the presence of significant sulfate concentrations, unless a high ratio of iron to arsenic, i.e. Fe/As between 2 and 4, is used to achieve the precipitation. This renders the formation of scorodite rather expensive, along with a need for elaborate burial procedures.

Therefore, it appears that improvement at the level of disposal of arsenic and antimony extracted from arsenic-containing ores or concentrates such as enargite and arsenopyrite for example are desirable from the present state of the art.

The present description refers to a number of documents, the content of which is herein incorporated by reference in their entirety.

SUMMARY OF THE INVENTION

More specifically, in accordance with the present invention, there is provided a method for vitrification of arsenic and antimony, comprising substituting oxygen to sulfur on thiosalts, incorporating resulting sodium arsenate and sodium antimonate into a sodium silicate glass-forming mixture and vitrifying the sodium silicate glass-forming mixture into a resulting glass sequestering the arsenic and the antimony.

There is further provided a method for sequestering arsenic and antimony of As/Sb-bearing sulfurated ores or concentrates, comprising oxidation of the arsenic and antimony in the As/Sb-bearing sulfurated ores or concentrates, and vitrification.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 is a flowchart of a method according to an embodiment of an aspect of the present invention.

DESCRIPTION OF ILLUSTRATIVE EMBODIMENTS

The present invention is illustrated in further details by the following non-limiting examples.

The method according to an embodiment of an aspect of the invention is described in relation to the flowchart of FIG. 1.

Arsenic and antimony exist as thiosalts, i.e. thioarsenate ($Na_3AsS_4$) or thiantimonate ($Na_3SbS_4$) respectively, when crystallized from basic dissolution with sodium sulfide $Na_2S$.

These thiosalts are oxidized in order to substitute oxygen to sulfur on the arsenic and the antimony, by air or oxygen, at a temperature in a range between about 200° C. and 400° C., with evolution of sulfur dioxide $SO_2$, as shown by the following relations:

$$Na_3AsS_4 + 6O_2 \rightarrow Na_3AsO_4 + 4SO_2 \tag{1}$$

$$Na_3SbS_4 + 6O_2 \rightarrow Na_3SbO_4 + 4SO_2 \tag{2}$$

The resulting sodium arsenate ($Na_3AsO_4$) and sodium antimonate ($Na_3SbO_4$) respectively can then be incorporated in a glass-forming mixture. The glass-forming mixture is essentially a sodium silicate $Na_2SiO_3$ comprising silica $SiO_2$ in a range between 40 and 75% w/w and sodium oxide $Na_2O$ in a range between 10 and 25% w/w under the form of sodium carbonate $Na_2CO_3$ for example, and rendered insoluble by the incorporation of one of: between 7 and 20% w/w ferric oxide $Fe_2O_3$, calcium oxide CaO in a range between 1 and 10% w/w for example, magnesium oxide MgO in a range between 0.1 and 2% w/w for example, aluminium oxide $Al_2O_3$ in a range between 0.1 and 2% w/w for example, potassium oxide $K_2O$ in a range between 0.1 and 2% w/w for example, or Titanium dioxide $TiO_2$ in a range between 0.1 and 2% w/w for example, alone or combined, in a total proportion in a range between about 5 and 20 w/w %, along with the sodium arsenate ($Na_3AsO_4$) and the sodium antimonate ($Na_3SbO_4$). The mixture may also comprise sodium oxide ($Na_2O$). The glass forming elements silica $SiO_2$ and sodium oxide $Na_2O$ may originate from recycled glass.

Sources of iron and silica such as fayalite ($Fe_2SiO_4$) and raw hematite ($Fe_2O_3.SiO_2$) can also be used as a source of iron oxide and silica in the glass-forming mixture.

It has been noted that if using hematite as a glass forming element, some amount of arsenic thiosulfate could be vitrified directly, i.e. oxidation need not be complete, to a level of one to two percent of sulfur in the mixture to be vitrified: during vitrification, such traces of sulfur are eliminated.

The glass-forming mixture is then vitrified, by heating at a temperature in a range between about 1000° C. and about 1200° C. under atmospheric pressure, for about one or two hours.

The resulting glass has a composition of up to 20 w/w % As; up to 10 w/w % Sb; $SiO_2$: 40 to 75 w/w %; $Na_2O$: 10 to 25 w/w %; CaO: 1 to 10 w/w %; $Fe_2O_3$: 7 to 20 w/w %; MgO, $Al_2O_3$, $TiO_2$, $K_2O$ combined: 0.1-3 w/w %.

The EPA test 1311 (acetic acid leaching) gave systemically leachates below the norm (5.0 ppm) for arsenic release. In the case of antimony, the leachate had a typical value of 0.0065 ppm Sb.

Sequestring arsenic and antimony by such glass formation thus proved to be a very definitive sequestration of arsenic and antimony, and turned out to be much more economical than the formation of scorodite, which calls for the oxidation of large amounts of iron, along with As, and still requires elaborate disposal after precipitation.

The following examples give a non-limitative illustration of the invention.

A concentrate of enargite having the following composition: As: 7.99 w/w %; Cu: 23.8 w/w %; Sb: 0.29 w/w %; S: 35.25 w/w %; Fe: 20.4 w/w %; Zn: 0.29 w/w %; Pb: 0.12 w/w % was leached as known in the art (see U.S. Pat. No. 3,911,078), a 200 g sample leading to 48.6 g of crystallized thioarsenate $Na_3AsS_4$, i. e. about 80% v of the theoretical amount of a complete reaction, i.e. there is about 20% loss during crystallisation. The elemental analysis of this thioarsenate indicated the presence of 1.08% Sb, most likely present as thioantimonate $Na_3SbS_4$.

A sample (40.0 g) of this arsenate of sodium was oxidized at about 400° C. in a Lindberg furnace, in a stream of oxygen adjusted so that all the arsenic oxide is condensed in the protruding end of the tube at the discharge end of the reactor acting as a condenser.

In this fashion, 25.8 g of sodium arsenate $Na_3AsO_4$, i.e. 85% of the theoretical amount, was collected.

This sodium arsenate (20.0 g) was mixed with 25.5 g of recycled glass (80-120 mesh), 0.65 g $Na_2SiO_3$, 2.55 g $Na_2CO_3$, 11.0 g $Fe_2O_3$ from a hematite raw ore containing 46.3% $Fe_2O_3$ and 52.5% $SiO_2$, and this glass-forming mixture was melted in a refractory crucible by heating in an electrically heated furnace for two hours at 1200° C.

After cooling, the glass thus formed had the following composition: As: 14.9 w/w %; Sb: 1.21 w/w %; Si: 25.2 w/w %; Na: 8.3 w/w %; Ca: 2.6 w/w %; Fe: 8.6%. The EPA acetic acid leaching procedure (1311) gave a leachate containing 2.95 ppm As well below the 5 ppm norm.

There is thus provided a method for vitrification of arsenic and antimony collected in the course of dearsenication of arsenical ores or concentrates of base metals, such as enargite.

The method comprises oxidating arsenic and antimony components in the As/Sb-bearing sulfurated ores or concentrates, thereby substituting oxygen to sulfur on the As and Sb components, followed by vitrification. The oxidation of the sulfurated As/Sb substrate is done by controlled admission of air or oxygen at such a rate as maintain the temperature of 200 to 400° C. in order to prevent volatilization of the As/Sb oxides thus formed. The resulting sodium arsenate ($Na_3AsO_4$) and sodium antimonate ($Na_3SbO_4$) are then incorporated in a glass-forming mixture for vitrification.

The vitrification yields a sodium silicate glass incorporating from 1 to 20 w/w % arsenic, from 1 to 10 w/w % of antimony and from 7 to 20 w/w % iron oxide, with amounts of $SiO_2$, $Na_2O$, $As_2O_3/As_2O_5$, $Sb_2O_3/Sb_2O_5$, allowing an insoluble homogeneous glass melting in the range between 1100 and 1200° C. where an arsenic release as per EPA procedure 1311 is below 5 ppm As.

There is thus provide a method for sequestration of arsenic and antimony extracted from As/Sb-bearing sulfurated ores or concentrates by first substituting oxygen to sulfur on the As/Sb substrate, followed by vitrification. The oxidation of the sulfurated As/Sb substrate is done by controlled admission of air or oxygen at such a rate as to maintain the temperature of 200 to 400° C. in order to prevent volatilization of the As/Sb oxides thus formed. A mixture is then formed with a relative ratio of $SiO_2$, $Na_2O$, $As_2O_3/As_2O_5$, $Sb_2O_3/Sb_2O_5$ and iron oxide. The vitrification yields sodium silicate glass incorporating from 1 to 20 w/w % of arsenic, from 1 to 10% w/w of antimony and from 7 to 20% w/w iron oxide, an insoluble homogeneous glass melting in the range between 1100 and 1200° C. with an arsenic release as per EPA procedure 1311 is below 5 ppm As.

The present method allows safe disposal of toxic contaminants As and Sb after their extraction.

The scope of the claims should not be limited by embodiments set forth in the examples, but should be given the broadest interpretation consistent with the description as a whole.

The invention claimed is:

1. Method for vitrification of arsenic and antimony of thiosalts, comprising oxidizing the thiosalts into at least one of sodium arsenate and sodium antimonate, incorporating the at least one of sodium arsenate and sodium antimonate into a glass-forming mixture and vitrifying into a resulting glass sequestering the arsenic and the antimony.

2. The method of claim 1, wherein said oxidizing the thiosalts is done by air or oxygen, at a temperature in a range between about 200° C. and 400° C.

3. The method of claim 1, wherein the glass-forming mixture comprises silica in a range between 40 and 75%, sodium oxide in a range between 10 and 25% w/w and ferric oxide in a range between 8 and 20% w/w.

4. The method of claim 1, wherein the glass-forming mixture comprises silica in a range between 40 and 75%, sodium oxide in a range between 10 and 25% w/w, and at least one of: ferric oxide in a range between 7 and 20% w/w, calcium oxide in a range between 1 and 10% w/w, magnesium oxide in a range between 0.1 and 2% w/w, aluminium oxide in a range between 0.1 and 2% w/w, potassium oxide in a range between 0.1 and 2% w/w and titanium oxide in a range between 0.1 and 2% w/w, alone or combined, in a total proportion in a range between about 5 and 20 w/w %.

5. The method of claim 1, wherein said vitrifying comprises heating the glass-forming mixture at a temperature in a range between about 1000° C. and about 1200° C. under atmospheric pressure.

6. The method of claim 1, wherein the resulting glass comprises arsenic in a range between 1 and 20 w/w % and antimony in a range between 1 and 10 w/w %.

7. The method of claim 1, wherein the resulting glass comprises arsenic in a range between 1 and 20 w/w %, antimony in a range between 1 and 10 w/w % and ferric oxide in a range between 7 and 20% w/w.

8. The method of claim 1, wherein the glass-forming mixture comprises iron oxide and silica.

9. The method of claim 1, wherein the glass-forming mixture comprises at least one of iron oxide, hematite and fayalite.

10. A method for sequestering arsenic and antimony of As/Sb-bearing sulfurated ores or concentrates, comprising oxidation of the arsenic and antimony in the As/Sb-bearing sulfurated ores or concentrates, and vitrification, wherein said oxidation is performed at a temperature in the range between 200 and 400° C., the method yielding a sodium silicate glass incorporating up to 20 w/w % arsenic, and up to 10 w/w % of antimony.

11. The method of claim 10, yielding a sodium silicate glass incorporating from 1 to 20 w/w % arsenic, from 1 to 10 w/w % of antimony and from 7 to 20 w/w % iron oxide, with amounts of at least one of: $SiO_2$, $Na_2O$, $As_2O_3/As_2O_5$, $Sb_2O_3/Sb_2O_5$.

12. The method of claim 10, wherein said vitrification comprises mixing with a glass-forming mixture comprising iron oxide and silica.

13. A method for sequestering arsenic and antimony of As/Sb-bearing sulfurated ores or concentrates, comprising oxidation of the arsenic and antimony in the As/Sb-bearing sulfurated ores or concentrates into at least one of sodium arsenate and sodium antimonate, and vitrification of the at least one of sodium arsenate and sodium antimonate with a glass-forming mixture comprising iron oxide and silica.

14. The method of claim 13, wherein the glass-forming mixture comprises at least one of: hematite and fayalite.

\* \* \* \* \*